United States Patent [19]

Malek

[11] Patent Number: 4,915,498
[45] Date of Patent: Apr. 10, 1990

[54] RANGE IMAGING SENSOR

[76] Inventor: Joseph H. Malek, 4027 Alabama Ave., NE., St. Petersburg, Fla. 33703

[21] Appl. No.: 183,619

[22] Filed: Apr. 19, 1988

[51] Int. Cl.$^4$ .......................... G01C 3/08; H04N 7/00
[52] U.S. Cl. ........................................ 356/5; 342/94; 358/95; 367/901
[58] Field of Search ............... 342/19, 92, 94; 367/98, 367/900, 901; 356/5; 358/95

[56] References Cited

U.S. PATENT DOCUMENTS

| | | | |
|---|---|---|---|
| 3,463,588 | 8/1969 | Meyerand, Jr. et al. | 356/5 |
| 3,683,324 | 8/1972 | Hoxsie . | |
| 3,689,156 | 9/1972 | Kerpchar | 356/5 |
| 3,902,803 | 9/1975 | Lego | 356/5 |
| 4,174,177 | 11/1979 | Gardner et al. | 356/5 |
| 4,397,549 | 8/1983 | Morgan | 356/5 |
| 4,785,429 | 11/1988 | Folwell et al. | 367/900 |

Primary Examiner—Stephen C. Buczinski
Attorney, Agent, or Firm—Dominik, Stein, Saccocio, Reese, Colitz & Van Der Wall

[57] ABSTRACT

A sensor for creating images containing range depth information is disclosed. The sensor comprises a gated energy transmitter used to "illuminate" the object to be imaged, a gated integrating imaging energy receiver to produce "raw" images, a processor system to combine the raw images from the receiver to produce a output image, and a timing system to control the gate timing of the transmitter and gate timing of the receiver. In operation, two raw images are created with differing time relationships between the transmitter gating, receiver gating and integrated energy readout. One raw image is a reference image containing no range information while the second image contains range information along with unwanted information such as reflectivity variations. These raw images are processed to produce a final output image in which the unwanted information is mainly cancelled producing an output "range" image. This output image is a one or two dimensional array of data. The position of data in the array is proportional to the angular displacement from the sensor's boresight. The data at each position in the array is proportional to the range from the sensor (or a reference distance from the sensor) to the point on the object being imaged as determined from the data's position in the array.

10 Claims, 2 Drawing Sheets

RANGE IMAGING SENSOR

BACKGROUND OF THE INVENTION

1. Field of the Invention

This invention relates to range measuring systems such as radar, optical range finders, both passive and active, and sonar ranging systems using acoustical energy. More particularly, the invention relates to implementations of such range measuring systems that create an image.

2. Description of the Background Art

The present state of the art basically comprises two major areas: time of flight measurement systems and trigonometric systems. The most common forms of radar, laser radar and sonar are all classified under the time of flight category, while CAT scanners (Computer Aided Tomography) and the range measuring ability of a human vision system are examples of trigonometric systems.

Time of flight systems make use of the finite and usually constant propagation speed of energy in various mediums. In the simplest form, a pulse of energy is launched into the medium in the direction of the object whose range is to be measured. This energy reflects off the object and returns to a receiver located near the transmitter. The time duration measured from the launching of the pulse to its reception is multiplied by the propagation speed of the energy in the medium. The result is then divided by two to give the range to the object. It is also possible to use a continuous energy beam that is modulated as a function of time to measure range in the same manner and, in fact, a pulse system represents one extreme of modulation.

Usually the transmitter in a time of flight system forms the energy into a beam so as to illuminate a spot on the object that has a small range variation relative to the distance from the transmitter to the object. The receiver is similarly focused to receive only energy from the area on the object at which the transmitter is radiating, thereby improving the signal to noise ratio at the receiver. The range measurement is the average range to the area on the object being measured. Further, the transmitted and received beams can be made to be coaxial. A significant advantage is therefore achieved in certain situations and constitutes a major distinction between time of flight systems and trigonometric systems.

The method used to measure the propagation time for the above system varies considerably depending on the accuracy desired and the intended use of the range measurement. The most common form of measurement is to use digital counting electronics. A clock is used to provide a reference time interval to a digital counter circuit. The counter is first cleared, then started when the pulse is transmitted and then stopped and its value read when the return pulse is received. The count is a measurement of the elapsed time that can then be converted into range. The signal to clear and start the counter is usually well defined since it is generated within the system. The signal to stop the counter, coming from the receiver, usually requires considerable processing.

In particular, signal strength variations of the received pulse, generated as a result of reflections of the transmitted energy off objects of varying reflectivity, are removed. Additional processing is performed to minimize other effects that degrade the measurement. It is important in a system of this type to be able to distinguish the shape of the received pulse so as to be able to make an accurate time measurement. Ultimately, the accuracy of the timing measurements results in a minimum range resolution for the system. It is also common in this type of system to limit the ranges over which the measurements are made. Basically, the time measurement system only measures the time to pulses which return within a specific time interval. This results in the system having a minimum range and a maximum range, the range difference is referred to as the range depth over which the system can make measurements. Usually provision is made to move this range depth interval back and forth in range so as to allow the examination of a greater total range interval while having a small instantaneous range depth.

The above system measures range only to one point on an object at a time. To create a range image, a scanning system is usually employed to sweep the transmit and receive beams over one or two dimensions. An implementation such as this is referred to as a serial scanner. The resultant range image is a one or two dimensional array of data. The location of the data in the array is determined by the relative direction in which the range measurement was made. The direction is specified as an angular offset from the boresight of the system. The data at a specific location is the range (or a function of range) to the object in that direction. The data is quantized by the range resolution of the system and usually any single image is limited in maximum and minimum value by the range depth of the system. The individual range measurement values in the image are referred to as image elements.

A primary advantage of serial scanned systems is low cost. Only one transmitter and one receive and one time measurement system is used along with the scanning system. The major disadvantage is that to increase the number of points being measured requires a longer time to make the total image, since each individual measurement requires a certain minimum time. In addition, since different parts of the image are measured at different times, movement of the system relative to the objects being measured, or vice-versa, can create undesired effects. By scanning multiple transmitter/receiver pairs, or multiple receivers per transmitter, these effects can be reduced and the time to create an image decreased, but at increased cost. Also, by using multiple receivers it may be possible that the array of receivers can cover the entire area desired, removing the need for a scanner. In this case, the transmitter needs to cover the entire area. Multiple receivers require multiple time measurement systems and a means of obtaining data from each timer.

A variation of a multiple receiver system that operates in the optical spectrum is the range gated camera, such as is disclosed in U.S. Pat. No. 3,380,358 to Neumann. The camera, although it is a single device physically, is an example of a multiple receiver since it measures the light coming from many different parts of the scene in parallel. In this implementation, a pulse transmitter consisting usually of some form of laser is combined with the camera and an optical gating device in the form of a gated image intensifier. The intensifier is placed on the front of the camera so as to be able to gate the light returned from the object the laser illuminates. Timing electronics synchronize the camera, the intensifier gate and the laser pulse.

In operation, the intensifier is held in an OFF state during and for some predetermined time after the laser sends out a pulse of light. At the end of this time period, the intensifier is gated ON for a short time, exposing the television camera in a manner similar to a photographic camera. The camera then outputs this image. The image is a binary measurement of a specific range and range resolution as determined by the delay time between the sending of the light pulse and the gating of the intensifier, the velocity of light and the duration of the transmitted pulse and the camera gate duration. If an object was located at a range within the range resolution interval being examined, then there will be a nonzero output from the camera at the points in the image where the object was found. If there was no object at the specified range, only a low noise level will be output. Even though objects within the range resolution interval produce an image similar to a television image, this intensity modulation cannot be used in a range gated camera to determine the range to the individual points on the objects within the range resolution interval. The output is only a binary YES, there is something within this range interval, or NO, there is nothing there. By making successive measurements at differing ranges it is possible to build a range image from this binary data.

The major advantage of the gated camera system is that even though it creates a measurement at only one range resolution interval, it makes this measurement in parallel for all the individual image elements of the television camera. Therefore, an increase in the angular resolution of the camera can be made by adding more picture elements, but this does not incur additional time to build the image as in a serial scanner.

The disadvantage of this system is that many images must be made at successive ranges to build a range image with any significant range resolution within the range depth interval. This incurs an increasing time penalty to build a higher range resolution images. In making these successive measurements, this type of system will also suffer from the problem of relative movement between the camera and the objects being imaged, similar to a serial scanner.

Trigonometric systems determine range by measuring the angles to the same point on an object from two locations separated by a known baseline distance. In effect, a triangle is determined where two angles and a side are known, thus the remaining side can be determined although typically the perpendicular distance from the baseline to the opposite apex is computed.

In one configuration, an imaging trigonometric system is comprised of two television cameras which are separated by a baseline. The imagery from each camera is then processed to identify identical points in both images. The location, or angular displacement, of the points in the respective images can then be used in conjunction with the known baseline distance to compute the range to the point. Another configuration locates a transmitter on one end of the baseline which radiates the object to be measured with a reference beam. At the opposite end of the baseline, a receiver is located which can measure the angular position on the object where the reference beam is located.

The main disadvantage of these systems is that the processing to find identical points in both images is computationally intensive and prone to error due to the fact that the same point in both images may never match exactly since both images were made from different directions. Low contrast in the images also makes the problem of locating identical points difficult to impossible. In addition to the range accuracy being dependent on how well the identical point was located in the individual images, the angular resolution of the images, and the baseline separation distance verses the range also effect the accuracy. In many applications, the fact that a trigonometric system requires a baseline separation precludes its use.

Therefore, it is an object of this invention to provide an apparatus which overcomes the aforementioned inadequacies of the prior art devices and provides an improvement which is a significant contribution to the advancement of the range imaging art.

Another object of this invention is to provide a range imaging sensor for creating images containing range depth information.

Another object of this invention is to provide a range imaging sensor including a transmitter for transmitting energy toward the object to be ranged, an integrating receiver for receiving reflected energy from the object and integrating such energy, and a timing system for controlling the transmitter and the receiver such that the receiver integrates more energy from nearer objects than farther objects thereby creating a composite image in the receiver that varies as a function of range and unwanted information.

Another object of this invention is to provide a range imaging sensor including transmitter and receiver means to produce a composite image containing range information along with unwanted information and to produce a reference image containing substantially only unwanted information and including processor means for dividing the composite image by the reference image to cancel variations in the composite image not related to range, thereby computing a range image substantially representative of range to the objects.

Another object of this invention is to provide a range imaging sensor including transmitter and receiver means to produce an additive image representative of extraneous energy or energy originated from the objects from sources other than the transmitter, that can be subtracted from the composite and reference images thereby improving image quality.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a range imaging sensor including a gated energy transmitter, a gated integrating imaging energy receiver, a processor to process the data from the receiver to produce an output range image, and a timing system to precisely control the timing of the transmitter and receiver.

More particularly, the gated energy transmitter comprises means for radiating energy in a controlled beam in a known direction. The timing system comprises means for timing the operation of the transmitter such that the transmitted beam can be turned ON and OFF in a very precisely controlled manner. The transmitter functions to provide a source of energy to reflect off the object or objects whose range image is to be created in such a manner that some portion of the energy returns to the receiver.

The gated integrating imaging energy receiver comprises means for collecting transmitted energy which has been reflected off an object or objects whose range is to be created, means for either directly integrating the collected energy or performing integration after the collected energy has been converted into another form. The integrator is gated ON and OFF but the gating is not necessarily done by the integrator. Means are provided for gating the integration ON or OFF for all the image elements. The receiver also comprises means for reading the contents of the integrator, which are image intensity levels, for sending to the processor and means for setting the contents of the integrator to a zero integrated energy state. The integrator gating, readout of the integrator and the zeroing of the integrator all are under precise control of the timing system and are synchronized with the transmitter gating. In addition, the receiver is configured to operate as an imaging system to perform the reception, gating, integration, zeroing of the integrator and output of the integrated data, on energy received from multiple directions and in parallel.

The output of the receiver is image data, but not in the final form of a range image. The processor which performs operations on the image data from the receiver is configured to hold one or more image data sets and combine these data sets in a defined fashion. The result of combining the image data produces the desired range image output.

The timing system of the sensor of the invention synchronizes the operation of all the sensor's components. In particular, the timing system determines the data content of the image data sets produced the receiver by controlling the time relationships between the transmitter gating, integrator gating and delay between the transmitter gating and the opening of the integrator gate.

Operation of the sensor of the invention begins in an initialization state in which the transmitter is gated OFF, the integrator is gated OFF, the integrator is initialized to a zero received energy state, the processor is initialized to receive an image from the receiver and no energy is propagating.

After reaching the initialization state, the timing system gates ON the transmitter for a very precisely controlled period. At the end of the period, the transmitter is gated OFF. The duration of the transmitter ON period is determined by the velocity of propagation of the energy being used in the medium in which it is propagating and the desired range depth of the image to be created.

After a precisely determined delay measured from the time the transmitter was gated ON, the receiver's integrator gate is turned ON to allow reflected transmitter energy entering the receiver to be integrated. The delay between the gating ON of the transmitter and the turning ON of the integrator gate is determined by the velocity of propagation of the energy being used in the medium in which it is propagating in, the range to the object being measured and the range depth of the image to be created. The integrator gate is turned OFF after a precisely controlled time also determined by the velocity of propagation of the energy being used in the medium in which it is propagating and the desired range depth of the image to be created. After the integrator gate is turned OFF, the data in the integrator is output to the sensor's processor. After the data is read out of the integrator, the integrator is reinitialized to a zero received energy state.

The duration that the transmitter is gated ON, the delay until the integrator gate is turned ON and the duration that the integrator gate is turned ON are each controlled in such a manner to produce an initial image data set whose contents are a function of both the range to the object and a number of other unwanted factors. These other unwanted factors include intensity variations caused by the object's reflectivity, variations in the transmitted energy across the object's surface, gain variations across the image elements of the receiver, and the like. The induced range variation is accomplished by the fact that reflected energy from points on the object being imaged that are nearer in range arrive at the receiver sooner than energy that is reflected from points on the object that are farther in range. Since the transmit beam is of finite duration, and the receive gate duration is finite, it is possible to integrate more energy from nearer points then farther points by gating the integrator at the proper time. In operation, the integrator gate is turned OFF so that not all the energy reflected from farther points is integrated. Therefore, the integrated level in the receiver varies as an inverse linear function of the range. Since the reflectivity of the object and other factors as mentioned above also effect the amount o energy received, the total image becomes a function of both the reflectivity and the range. This image is called the composite image. This image is sent to the sensor's processor.

The above process of creating an image is then repeated beginning with the initialization state but with different transmitter gate timing. This new timing produces an image output from the receiver which is mostly identical with the first image but does not include the variation with range which is induced in the first image. This is accomplished by extending the duration of the transmitted energy pulse for a sufficient duration to allow equal amounts of energy to be received from all ranges within the range depth interval. This image, which is called the reference image, is input to the sensor's processor which also receives the first image obtained.

The processor, when it receives the reference image, combines it with the composite image. This process is carried out in a manner that causes the non-range variations of the composite image to mostly cancel with the non-range variations of the reference image, resulting in an image that is mainly a function of range. This range image is output from the processor. The above sequence of creating two images and combining them to produce a resultant range image can then be repeated as desired.

An improvement in the range image can be achieved by cancelling effects of energy entering the receiver from sources other then the transmitter. This energy is additive to the composite and reference images and can be measured by operating the invention in the previous manner but without the transmitter gated on. The resultant image, called the additive image, is then sent to the processor. In the processor, the additive image is subtracted from the reference image and composite image prior to the combining of the composite and reference image. This subtraction mostly cancels the effects of extraneous energy entering the receiver.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
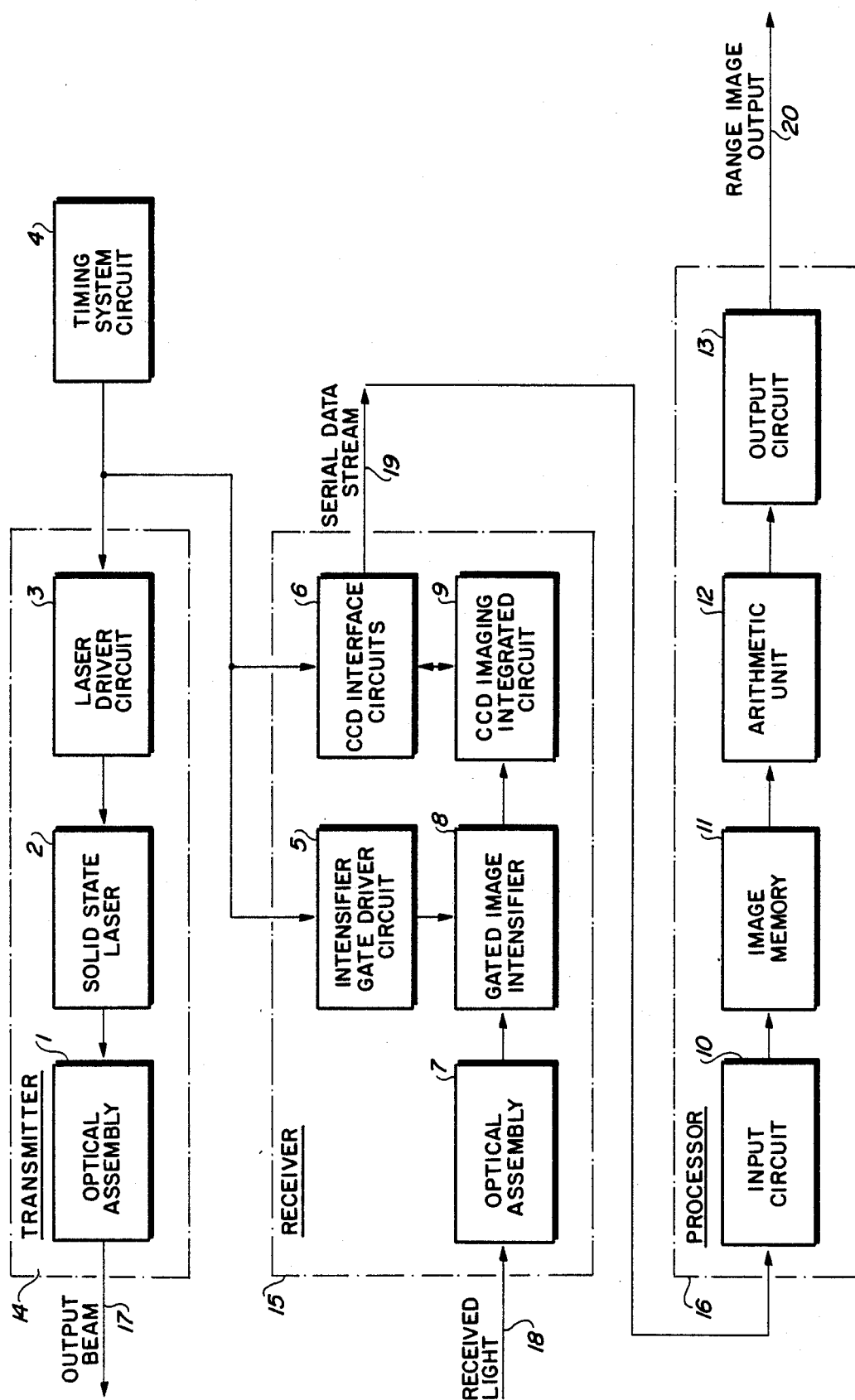
FIG. 1 is a block diagram of the range imaging sensor of the invention showing the interrelationships between its various systems.

FIG. 1 is a block diagram of the components of a preferred embodiment of the range imaging sensor 10 of the invention using electromagnetic energy at optical wavelengths. The transmitter 14 comprises of a pulsed solid state laser 2 whose output is combined with an optical assembly 1 for forming into an output beam 17 of the desired angular diameter to fully illuminate the object whose range image is to be generated. The transmitter 14 is connected to an electronic laser driver circuit 3 used to generate the proper voltage and currents as required by the solid state laser 2. The laser driver circuit 3 is in turn connected to the timing system circuit 4.

The receiver 15 comprises an optical assembly 7 which focuses the received light 18 onto the front surface of a gated image intensifier 8. The optical assembly 7 is designed to produce an image on the gated image intensifier 8 whose field of view matches that region which is illuminated by the transmitter 14. The gated image intensifier 8 is connected to an intensifier gate driver circuit 5 which generates the proper voltages and currents to drive the gated image intensifier 8 either OFF or ON to prevent or allow light to pass therethrough.

The optical output from the gated image intensifier 8 is coupled to a CCD imaging integrated circuit 9. The CCD imaging integrated circuit 9 is in turn coupled to a CCD interface circuit 6 that can read and digitize the data from the individual picture elements in the CCD imaging integrated circuit 9 and format them into a serial data stream 19 which is output to the processor 16. In addition, the CCD interface circuit 6 can clear the contents of the CCD imaging integrated circuit 9 to a zero integrated light energy level. The intensifier gate driver circuit 5 and the CCD interface circuit 6 are under timing control of the timing system circuit 4.

The serial data stream 19 from the receiver 15 is input to the processor 16 which is preferably a special purpose digital computer. The processor's 16 input circuit 10 stores in its image memory 11 one or more entire images as produced by the CCD imaging integrated circuit 9. When sufficient images are available, the processor 16 combines the images stored in the image memory 11 by performing operations on the individual picture element data in the processor's 16 arithmetic unit 12, in a defined manner, to produce the range image output 20, which is output by the output circuit 13. This output is either digital data or analog data.

The timing system circuit 4 is an electronic circuit that synchronizes the operation of all components of the sensor 10 in such a manner as to produce the desired results.

Figure 2:
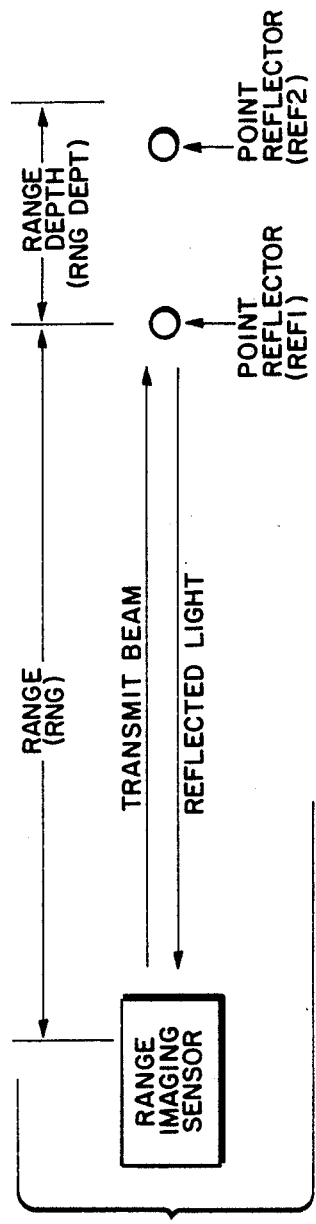
FIG. 2 is a diagrammatic drawing of the geometrical relationships of the range imaging sensor of the invention, the range to the range depth interval, the range depth interval and the two point reflectors.
Figure 3:
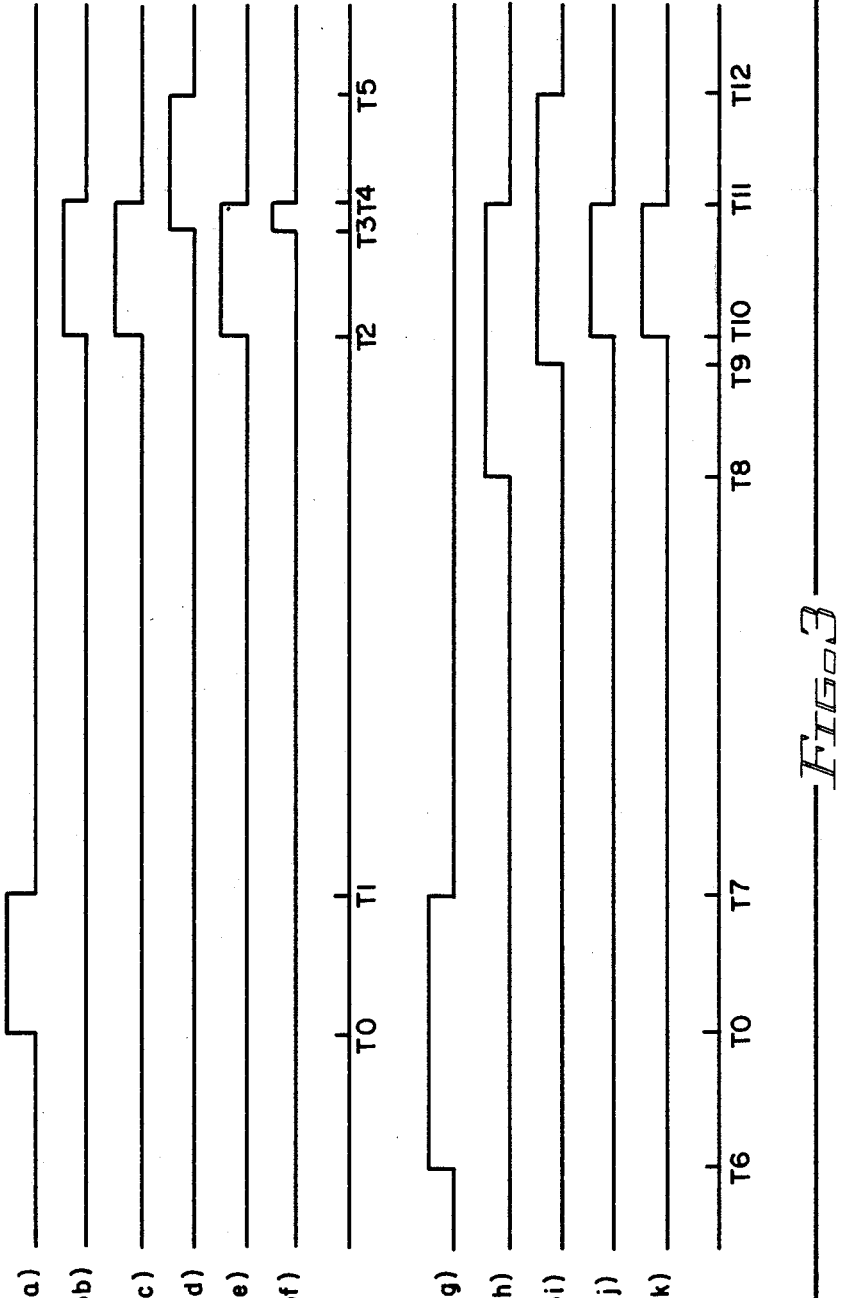
FIG. 3 is a timing diagram of the sequence of events which take place within the method of the range imaging sensor of the invention.

The basic operation of the range imaging sensor 10 proceeds as shown in the timing diagrams of FIG. 3. These timing diagrams refer to the geometrical relationships shown in FIG. 2. In FIG. 2, the sensor 10 is separated from the range depth interval, RngDept, by the range distance, Rng. Within the range depth interval are located two point reflectors, Ref1 and Ref2, which are used in the following discussion to demonstrate the operation of the invention.

Composite Image

Referring to FIG. 2, after a suitable interval to allow any previously transmitted light pulses to dissipate, the timing system circuit 4 gates the transmitter 14 ON for a short period commencing at time t0 and ending at time t1 in FIG. 3a. The length of this period is determined by the desired range depth and the velocity of light as follows:

$$Ton = (RngDept/C) * 2.0$$

where:

Ton=Transmitter output pulse length in seconds, (t1–t0 in FIG. 3a)
C=Speed of light in meters per second.
TngDept=Desired range depth in meters.

Ton represents a minimum time duration for the transmitter 14 output pulse. Ton may be made longer, but the excess light will not be used by the receiver 15 since it will be gated OFF by the gated image intensifier 8. Ton should not be made shorter, or the resultant image produced will not vary in intensity as a function of range in the desired manner.

After a suitable delay (t1 to t2 in FIG. 3b), the gated image intensifier 8 is turned on for a specific time duration (t2 to t4). The duration of the delay is determined by the range at which the range image 20 is to be made and is computed as follows:

$$Tdelay = (Rng/C) * 2.0$$

where:

Tdelay=Delay time from the starting edge of the transmit pulse to the starting edge of the intensifier gate pulse as measured in seconds (t2−t0 in FIG. 3b)

Rng=Desired range measured in meters from a reference distance in the sensor to the start of the range depth interval C=Speed of light in meters per second.

The duration of the gated image intensifier 8 gating pulse (t4–t2 in FIG. 3b) is computed in the same manner as that for the transmitter 14 pulse duration (t1–t0 in FIG. 3a). The transmitter 14 power should be adjusted along with other system parameters such as gated image intensifier 8 gain and CCD imaging integrated circuit 9 sensitivity so that the CCD imaging integrated circuit 9 is not saturated (or over exposed) by light from nearer objects.

FIG. 3c shows the timing of a light pulse (t2 to t4) reflected back to the receiver 15 from a close point reflector located at the beginning of the range depth interval (Ref1 of FIG. 2). FIG. 3d shows the timing of a light pulse (t3 to t5) reflected from a far point reflector, (Ref2 of FIG. 2) located further away in the range depth interval. Both FIGS. 3c and 3d are timing diagrams for the light as it enters the receiver 15.

FIG. 3e shows the timing diagram of the light from FIG. 3c after it has passed through the gated imaging intensifier 8 and is being integrated in the CCD imaging integrated circuit 9. It can be seen that the maximum amount of light available will be integrated since the gated image intensifier 8 gate ON duration (t2 to t4 of FIG. 3b) and the reflected light pulse (t2 to t4 of FIG. 3c) coincide.

FIG. 3f shows the timing diagram of the light pulse (t3 to t5 of FIG. 3d) after it has passed through the gated imaging intensifier 8 and is being integrated in the CCD imaging integrated circuit 9. It can be seen in FIG. 3f that only a portion of the available light pulse (t3 to t4) is being integrated by the CCD imaging integrated circuit 9 since the gated imaging intensifier 8 (t2 to t4 of FIG. 3b) is cutting OFF the remainder of the available light. This effect of cutting off a portion of the available light is proportional to the range from which the light was reflected. Its effect induces the linear variation of intensity with range as desired in the image as a result of the integration in the CCD imaging integrated circuit 9.

Since the intensity of light reflected from the objects will also be affected by the object's reflectivity and other effects, which are independent of the induced range variation, the intensity of the image produced above will also vary as a function of these other factors. This image is the composite image and it is stored in the processor 16.

Reference Image

The above process is then repeated, but with a modification to the previous transmit gate duration (t0 to t1 of FIG. 3a). Specifically, the pulse width is doubled over that previously used (t6 to t7 of FIG. 3g). This has the effect of removing the induced range dependency which is present in the composite image. This is accomplished by the fact that when the gated imaging intensifier 8 gate is turned on (t2 to t4 of FIG. 3b) the near point reflector at the start of the range depth interval (Ref1 of FIG. 2) will have been reflecting light back to the receiver 15 already for one half of the transmit pulse duration (t8 to t10 of FIG. 3h). The far point reflector further away in the range depth interval (Ref2 of FIG. 2) has also been returning the light pulse to the receiver 15 prior to the start of the gated imaging intensifier 8 gate period (t2 of FIG. 3b). By the end of the gated imaging intensifier 8 gate period (t4 of FIG. 3b), the near reflectors at the start of the range depth interval and the far reflectors at the end of the interval have been reflecting light back to the receiver 15 for the entire duration of the gated image intensifier's 8 gate ON period (t2 to t4 of FIG. 3b). This can be seen by the fact that the light pulses that pass through the gated imaging intensifier 8 as shown in FIG. 3j (t10 to t11) for the light pulse of FIG. 3h (t8 to t11) and FIG. 3k (t10 to t11) for the light pulse of FIG. 3i (t9 to t12) are identical. The total amount of light which then passed through the gated imaging intensifier 8 is integrated in the CCD imaging integrated circuit 9 and is therefore independent of the induced range variation and varies mainly as a function of other factors such as the object's reflectivity. This image is the reference image.

Range Image

The reference image is sent to the processor's 15 input circuit 10 to be stored in the image memory 11. In the processor 16 the composite image is divided by the reference image on an image element by image element basis in the arithmetic unit 12. This computation mostly cancels the variations in the composite image that were not related to the induced range variation. The resultant range image produced by this computation is mainly dependent on the range and is the output 20 from the sensor.

The analysis above assumes that the range depth and the range have been adjusted so that all objects in the field of view of the sensor fall within the range depth interval. If there are objects within the field of view, but either in front of the range depth interval or behind the range depth interval, erroneous results may occur. The process of creating range images should then be repeated as desired.

Additive Image

A further operation can be performed to improve the image quality. The improvement removes additive effects of extraneous light, or light originated from the objects being imaged or reflected from those objects from sources other then the transmitter 15. To remove the effects of these undesired sources, another image is generated with the same gated imaging intensifier 8 gate timing (t2 to t4 of FIG. 3b), but with no transmitted pulse. This image, referred to as the additive image, is sent to the processor 16 for storage. The procedure described above is then performed to produce the previous two images. In the processor 16, before the composite and reference images are divided, the additive image is subtracted from each of them to remove the effects of the unwanted illumination. The division is then performed and the resultant range image output 20.

The sequence in which the individual images are generated and sent to the processor 14 to create the output range image 20 is not important to the generation of the resultant image.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described:
What is claimed is:

1. A range imaging sensor for creating images substantially a function of range to an object within a range depth, comprising in combination:
   gated energy transmitter means for transmitting energy towards the object;
   gated integrating imaging receiver means for receiving said transmitted energy reflected by the object and integrating said received energy for the images;
   timing means for gating said transmitter means and said receiver means, said timing means comprising
      means for initializing an integration level of said integration means,
      means for gating said transmitter means and said receiver means such that said integration means produces a composite image which is substantially a function of range and unwanted information, and
      means for gating said transmitter means and said receiver means such that said integration means produces a reference image which is substantially a function of said unwanted information; and
   processor means for combining said composite image and said reference image to produce a range image which is substantially a function of the range.

2. The range image sensor as set forth in claim 1, wherein said means for gating said transmitter means and said receiver means such that said integration means produces a composite image which is substantially a function of range and said unwanted information comprises:
   gating said transmitter means ON for a first minimum time duration substantially equal to twice the propagation time of said transmitted energy across the range depth;
   waiting a time delay period substantially equal to twice the propagation time of said transmitted energy from said transmitter means to substantially the beginning of the range depth; and
   gating said receiver means for substantially said first minimum time duration after said time delay, whereby the energy being integrated is proportional to the range and said unwanted information.

3. The range image sensor as set forth in claim 2, wherein said means for gating said transmitter means and said receiver means such that said integration means produces a reference image which is substantially a function of said unwanted information comprises
   gating said transmitter means ON for a second minimum time duration substantially twice said first minimum time duration;
   waiting another said time delay period; and
   gating said receiver means for substantially said first minimun time duration after said time delay, whereby the energy being integrated is proportional to said unwanted information.

4. The range image sensor as set forth in claim 1, wherein said timing means further comprises means for gating said receiver means such that said integration means produces an additive image which is substantially a function of extraneous energy from the object and wherein said processor means further comprises means for subtracting said additive image from said composite image and said reference image.

5. The range image sensor as set forth in claim 4, wherein said means for gating said receiver means such that said integrator means produces an additive image which is substantially a function of extraneous energy comprises gating said receiver means for substantially said first minimum time duration, whereby the energy being integrated is a function of extraneous energy.

6. A method for creating images substantially a function of range to an object within a range depth, comprising the steps of:
   transmitting energy towards the object by a gated transmitter means;
   receiving, by a gated integrating imaging receiver, said transmitted gated energy reflected by the object and integrating said received energy for the images;
   gating said transmitter means and said receiver means, including
      initializing an integration level,
      gating said transmitter means and said receiver means such that a composite image is produced which is substantially a function of range and unwanted information, and
      gating said transmitter means and said receiver means such that a reference image is produced which is substantially a function of said unwanted information; and
      combining said composite image and said reference image to produce a range image which is substantially a function of the range.

7. The method as set forth in claim 6, wherein said step of gating said transmitter means and said receiver means such that a composite image is produced which is substantially a function of range and said unwanted information comprises:
   gating said transmitter means ON for a first minimum time duration substantially equal to twice the propagation time of said transmitted energy across the range depth;
   waiting a time delay period substantially equal to twice the propagation time of said transmitted energy from said transmitter means to substantially the beginning of the range depth; and
   gating said receiver means for substantially said first minimum time duration after said time delay, whereby the energy being integrated is proportional to the range and said unwanted information.

8. The method as set forth in claim 7, wherein said step of gating said transmitter means and said receiver means such that a reference image is produced which is substantially a function of said unwanted information comprises:
   gating said transmitter means ON for a second minimum time duration substantially twice said first minimum time duration;
   waiting another said time delay period; and
   gating said receiver means for substantially said first minimum time duration after said time delay, whereby the energy being integrated is proportional to said unwanted information.

9. The method as set forth in claim 6, wherein said step of gating said transmitter means and said receiver means comprises gating said receiver means such that an additive image is produced which is substantially a function of extraneous energy from the object and wherein said step of combining said composite image and said reference image further comprises subtracting said additive image from said composite image and said reference image.

10. The method as set forth in claim 9, wherein said step of gating said receiver means such that an additive image is produced which is substantially a function of extraneous energy comprises gating said receiver means for substantially said first minimum time duration, whereby the energy being integrated is a function of extraneous energy.

* * * * *